US011073649B2

(12) United States Patent
Okamura

(10) Patent No.: US 11,073,649 B2
(45) Date of Patent: Jul. 27, 2021

(54) LINE ILLUMINATING DEVICE

(71) Applicant: Yazaki Corporation, Tokyo (JP)

(72) Inventor: Sho Okamura, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 17/070,023

(22) Filed: Oct. 14, 2020

(65) Prior Publication Data

US 2021/0116620 A1    Apr. 22, 2021

(30) Foreign Application Priority Data

Oct. 16, 2019   (JP) .............................. JP2019-189237

(51) Int. Cl.
    *F21V 8/00*    (2006.01)
(52) U.S. Cl.
    CPC ........... *G02B 6/001* (2013.01); *G02B 6/0006* (2013.01)
(58) Field of Classification Search
    CPC ........................................... G02B 6/0001–001

USPC .................................................. 362/551–582
See application file for complete search history.

(56) References Cited

U.S. PATENT DOCUMENTS 9,266,468 B2*   2/2016   Mizushiro ............ G02B 6/0038

FOREIGN PATENT DOCUMENTS

JP           2017-136944 A      8/2017

* cited by examiner

*Primary Examiner* — Jason M Han
(74) *Attorney, Agent, or Firm* — Sughrue Mion, PLLC

(57) ABSTRACT

Provided is a line illuminating device including: a light-emitting unit including a light-emitting-unit housing and a light emitter that emits light; a light guide including a light-guide body formed in a rod shape and a light-guide flange provided at a first end portion of the light-guide body; and a case including a case body formed in a rod shape, the case body being partially open when viewed in a longitudinal direction of the case body, the case body housing the light-guide body inside, in which the light-guide flange is interposed between a first end in the longitudinal direction of the case body and the light-emitting-unit housing, and a space is formed between an end of the light-guide body and the light emitter.

3 Claims, 5 Drawing Sheets

LINE ILLUMINATING DEVICE

CROSS-REFERENCE TO RELATED APPLICATIONS

The present application is based on, and claims priority from Japanese Patent Application No. 2019-189237, filed on Oct. 16, 2019, the entire contents of which are incorporated herein by reference.

TECHNICAL FIELD

The present application relates to a line illuminating device.

BACKGROUND

An illuminating device disclosed in JP 2017-136944 A includes an LED, a light guide, and a positioning member. The LED is provided with a light-exit face. The light guide is formed in an elongated shape.

The light guide has an end face opposed to the light-exit face of the LED and a light-exit face through which light having entered from the end face travels outward. The positioning member positions the end face of the light guide to the LED.

SUMMARY

However, in the illuminating device disclosed in JP 2017-136944 A, because the end face of the light guide as a light-entrance face and the positioning member are in contact with each other, the end face of the light guide and the face of the positioning member in contact with the end face of the light guide are likely to be damaged. Due to occurrence of damage, deterioration in the performance of light distribution, such as a drop in illuminance, is likely to occur.

An object of the present application is to provide a line illuminating device that includes a light-emitting unit, a light guide including a rod-shaped light-guide body, and a case housing the light-guide body inside, and enables inhibition of deterioration in the performance of light distribution, such as a drop in illuminance.

A line illuminating device according to an embodiment includes: a light-emitting unit including a light-emitting-unit housing and a light emitter that emits light; a light guide including a light-guide body formed in a rod shape and a light-guide flange provided at a first end portion that is one end portion in a longitudinal direction of the light-guide body; and a case including a case body formed in a rod shape, the case body being partially open when viewed in a longitudinal direction of the case body, the case body housing the light-guide body inside, in which the light-guide flange is interposed between a first end in the longitudinal direction of the case body and the light-emitting-unit housing, and a space is formed between a first end in the longitudinal direction of the light-guide body and the light emitter.

In the line illuminating device according to the embodiment, the light-guide flange and the light-emitting-unit housing are provided with respective alignment portions, the alignment portion of the light-guide flange and the alignment portion of the light-emitting-unit housing engage with each other, and a center of a first end face in the longitudinal direction of the light-guide body and a center of the light emitter are identical to each other when viewed in the longitudinal direction of the light-guide body.

In the line illuminating device according to the embodiment, a truncated-cone lateral engagement face is provided on a first side that is one side in a thickness direction of the light-guide flange, a planar engagement face is provided on a second side that is another side in the thickness direction of the light-guide flange, the light-emitting-unit housing is provided with a truncated-cone lateral engagement face, the first end in the longitudinal direction of the case body is provided with a planar engagement face, the planar engagement face of the light-guide flange has surface contact with the planar engagement face of the case body, and the truncated-cone lateral engagement face of the light-guide flange has surface contact with the truncated-cone lateral engagement face of the light-emitting-unit housing.

The above configurations enable provision of a line illuminating device enabling inhibition of deterioration in the performance of light distribution, such as a drop in illuminance.

DETAILED DESCRIPTION

Figure 1:
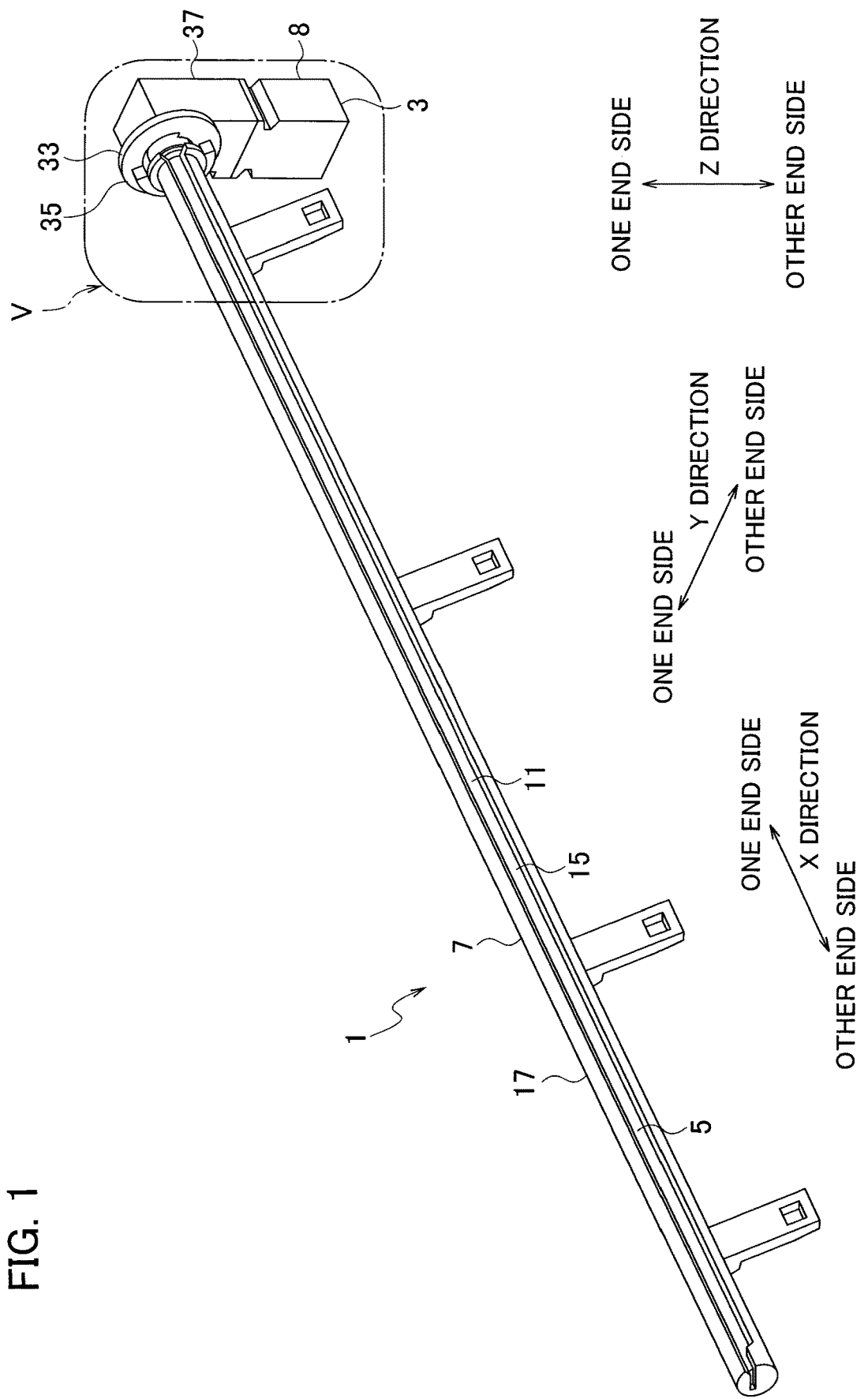
FIG. 1 is a perspective view of a line illuminating device according to an embodiment of the present application.
Figure 2:
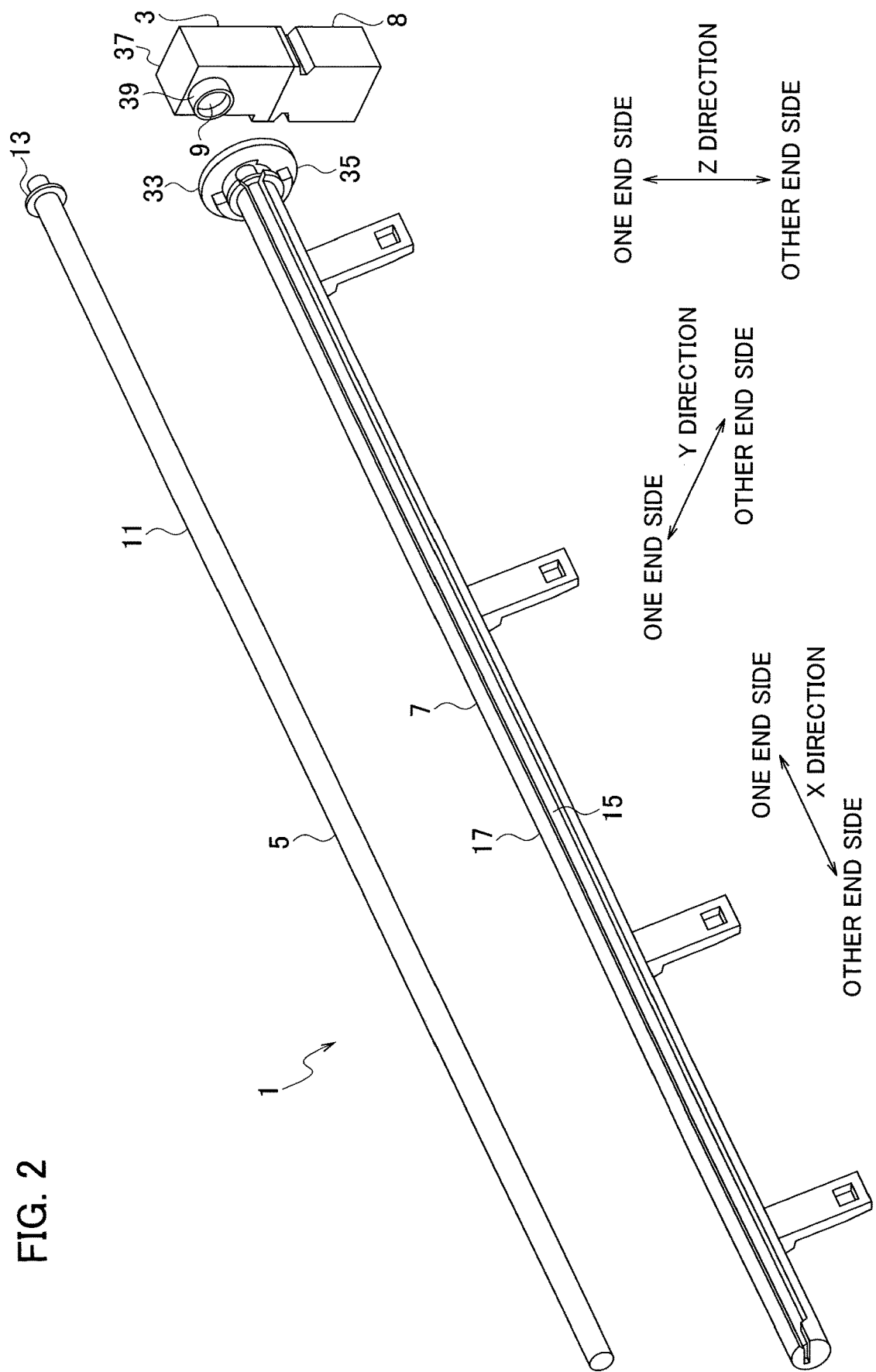
FIG. 2 is an exploded perspective view of the line illuminating device according to the embodiment of the present application.

A line illuminating device 1 according to an embodiment of the present application is intended to be fixed, for example, in the room of a vehicle so as to be used, and includes a light-emitting unit 3, a light guide 5, and a case 7, as illustrated in FIGS. 1 and 2.

Herein, for convenience of description, as illustrated in FIG. 1, a predetermined direction parallel to the longitudinal direction of the light guide 5 in the line illuminating device is defined as an X direction. A predetermined direction orthogonal to the X direction is defined as a Y direction. The direction orthogonal to the X direction and the Y direction is defined as a Z direction. Note that, for example, "forward and backward" and "upward and downward" directions are determined for convenience of description, and thus the actual attachment posture and the like of each constituent element are not limited to the directions.

Figure 6:
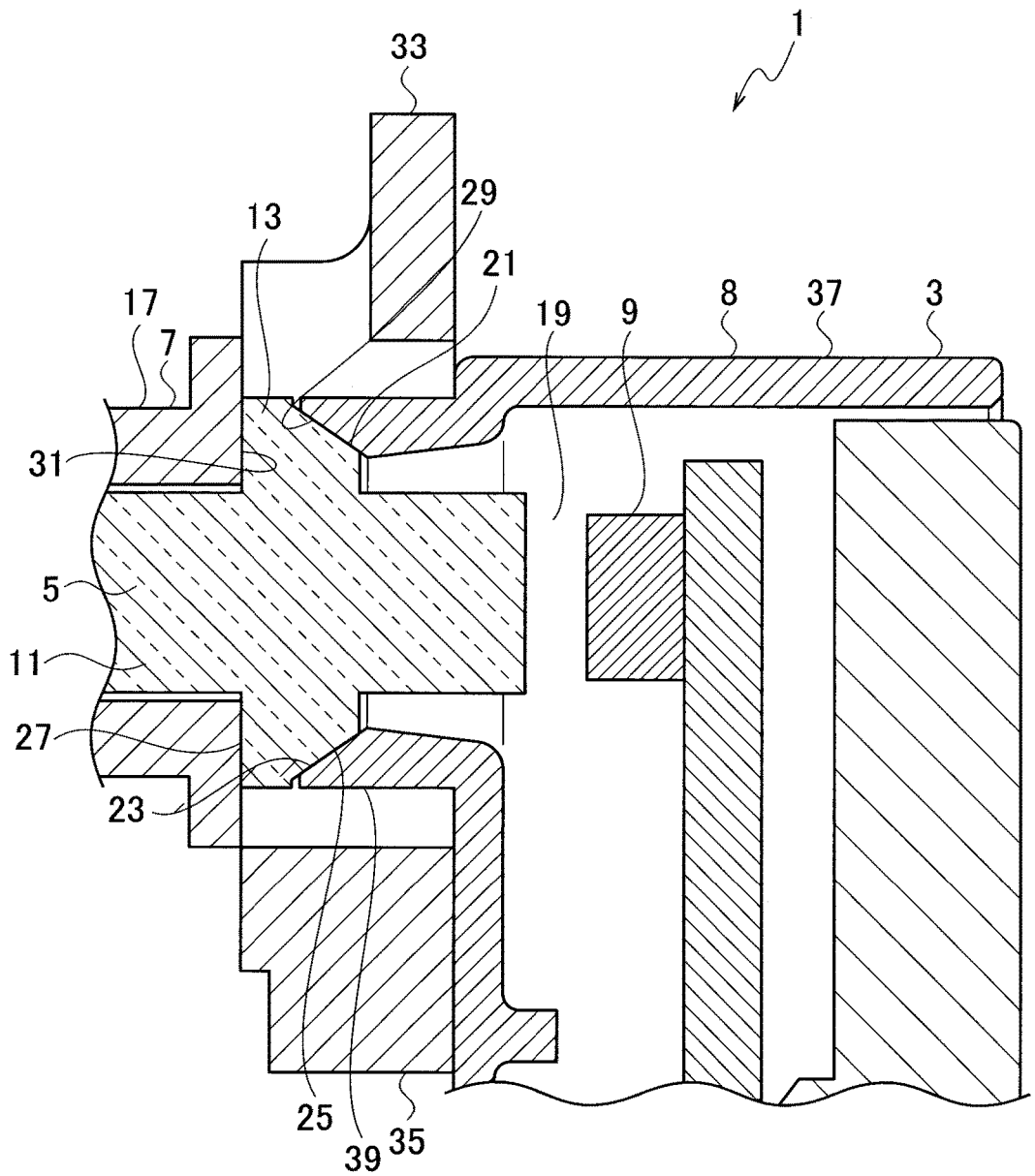
FIG. 6 is a sectional view taken along line VI-VI of FIG. 5B.

The light-emitting unit 3 includes a light-emitting-unit housing 8 and a light emitter 9, for example, as illustrated in FIG. 6. The light emitter 9 includes, for example, an LED, and emits visible light, such as white light. The light emitter 9 is provided integrally with the light-emitting-unit housing 8 inside the light-emitting-unit housing 8.

Figure 3:
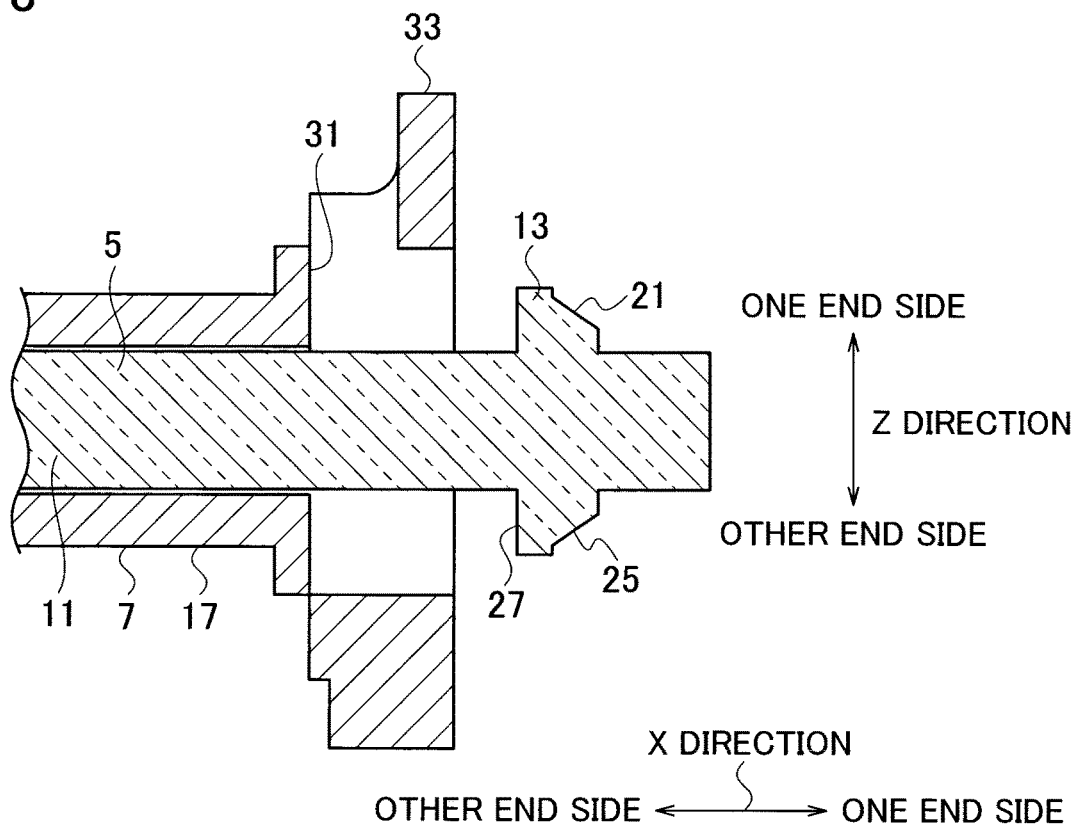
FIG. 3 is a partial sectional view of the line illuminating device according to the embodiment of the present application, illustrating a procedure of fixing of a light guide to a case.
Figure 4:
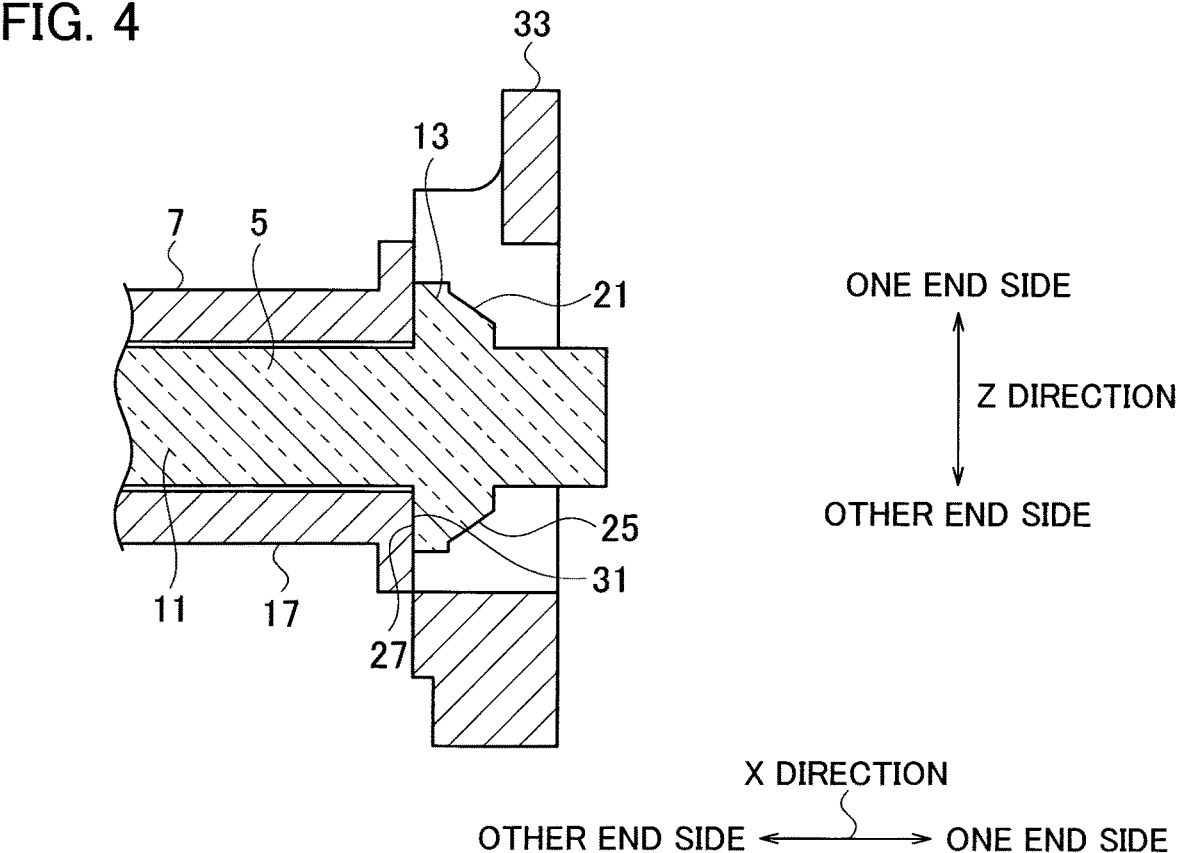
FIG. 4 is a partial sectional view of the line illuminating device according to the embodiment of the present application, illustrating a procedure of fixing of the light guide to the case.
Figure 5A:
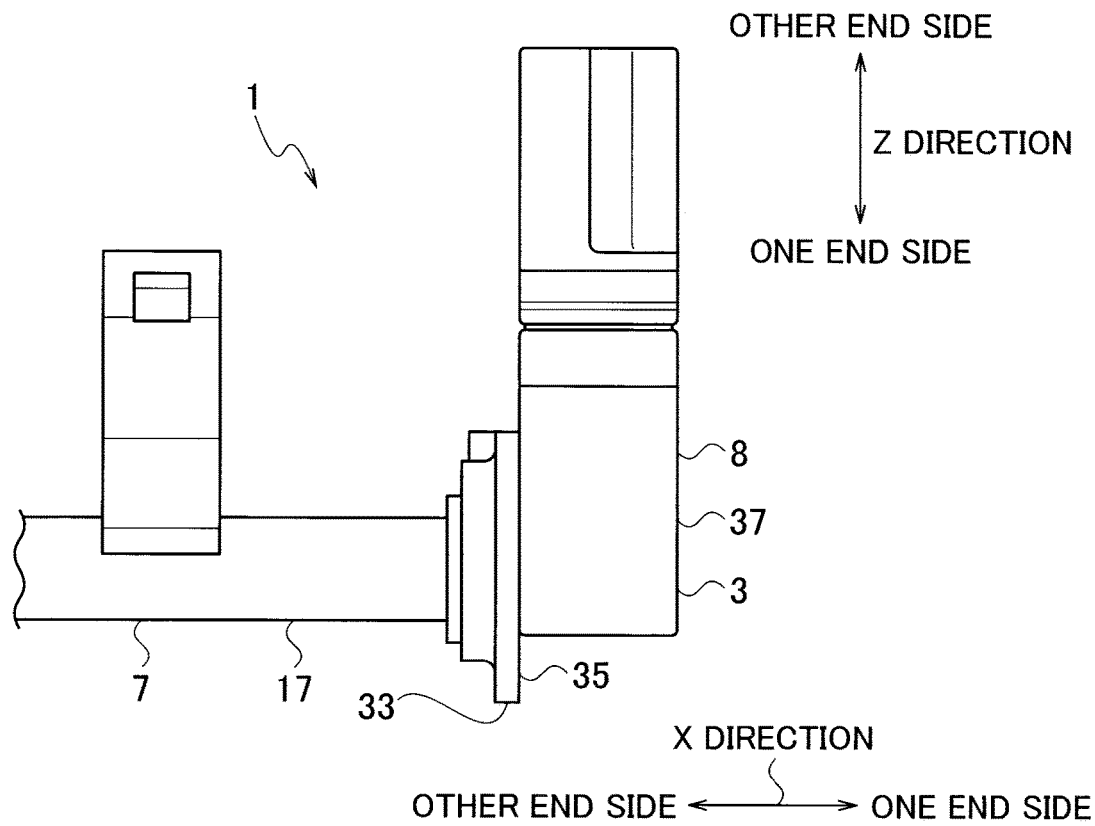
FIG. 5A is an enlarged view of part V of FIG. 1, viewed along arrow VA of FIG. 5B.
Figure 5B:
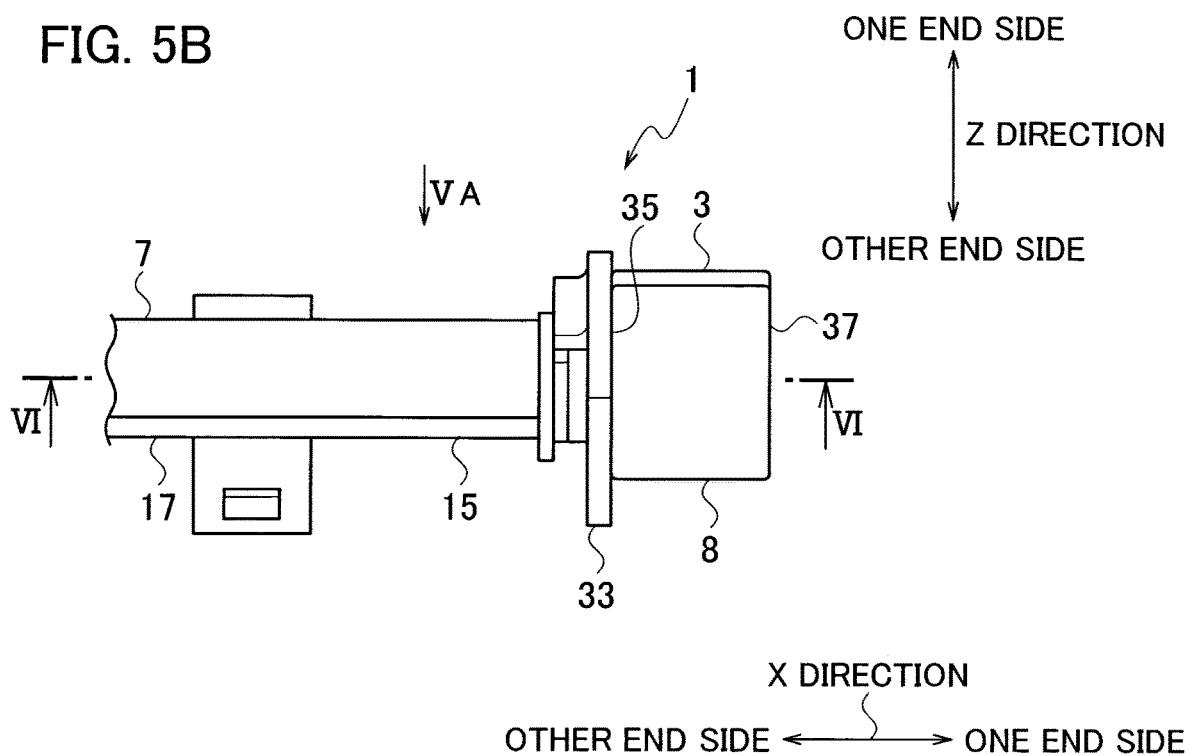
FIG. 5B is an enlarged view of part V of FIG. 1, illustrating the line illuminating device viewed in a Z direction.

The light guide (light-guide rod) 5 is formed of a transparent material including colored transparency or a translucent material including colored transparency. As illustrated in FIGS. 2 to 4 and in FIG. 6, the light guide 5 includes a light-guide body 11 formed in a rod shape, such as an elongated columnar shape, and a light-guide flange 13 provided at a first end portion that is one end portion in the X direction that is the longitudinal direction of the light-guide body 11.

The light-guide body 11 transmits light emitted from the light-emitting unit 3, inward through a first end in the X direction that is the longitudinal direction, to guide the light in the longitudinal direction.

The case 7 is formed of a material impervious to light. For example, as illustrated in FIG. 2, the case 7 includes a case body 17. The case body 17 is formed in a rod shape, and is partially open when viewed in the X direction that is the longitudinal direction. That is, the case body 17 has an opening 15 at a part when viewed in the longitudinal direction.

The light-guide body 11 is housed inside the case body 17 such that the longitudinal direction of the light-guide body 11 is identical to the longitudinal direction of the case body 17. In the housed state, the longitudinal direction of the light-guide body 11 and the longitudinal direction of the case body 17 are identical to each other, and the light-guide body 11 and the case body 17 extend in the X direction.

Note that the light-guide body 11 and the case body 17 each have slight flexibility and thus the light-guide body 11 and the case body 17 bend slightly. Even in a case where slight bending occurs, each longitudinal direction is defined as the X direction.

As illustrated in FIG. 6, in the line illuminating device 1, the light-guide flange 13 of the light guide 5 is interposed between a first end in the longitudinal direction (X direction) of the case 7 (case body 17) and the light-emitting-unit housing 8 of the light-emitting unit 3. Thus, the light-emitting unit 3, the light guide 5, and the case 7 are integrated. A certain space 19 is formed between the first end in the longitudinal direction of the light-guide body 11 and the light emitter 9 of the light-emitting unit 3.

The light-guide flange 13 is provided with an alignment portion 21, and the light-emitting-unit housing 8 is provided with an alignment portion 23.

In the line illuminating device 1, the alignment portion 21 of the light-guide flange 13 and the alignment portion 23 of the light-emitting-unit housing 8 engage with each other. When viewed in the X direction of the light-guide body 11, the center of a first end face in the longitudinal direction of the light-guide body 11 and the center of the light emitter 9 are identical to each other.

A truncated-cone lateral engagement face 25 is provided on a first side that is one side in the thickness direction of the light-guide flange 13. The truncated-cone lateral engagement face 25 forms the alignment portion 21 of the light-guide flange 13. A planar engagement face 27 is provided on a second side that is the other side in the thickness direction of the light-guide flange 13.

The light-emitting-unit housing 8 is provided with a truncated-cone lateral engagement face 29. The truncated-cone lateral engagement face 29 forms the alignment portion 23 of the light-emitting-unit housing 8. A planar engagement face 31 is provided at the first end in the longitudinal direction (X direction) of the case 7 (case body 17).

Then, in the line illuminating device 1, the planar engagement face 27 of the light-guide flange 13 has surface contact with the planar engagement face 31 of the case 7, and the truncated-cone lateral engagement face 25 of the light-guide flange 13 has surface contact with the truncated-cone lateral engagement face 29 of the light-emitting-unit housing 8.

Herein, the line illuminating device 1 will be described in further detail.

As described above, the light guide 5 includes the light-guide body 11 and the light-guide flange 13. The light-guide body 11 is formed in an elongated columnar shape, and the light-guide flange 13 is formed in a discoid shape. The thickness direction of the light-guide flange 13 is identical to the X direction. The truncated-cone lateral engagement face 25 of the light-guide flange 13 is formed on one end side in the X direction that is one side in the thickness direction of the light-guide flange 13. The outer diameter of the truncated-cone lateral engagement face 25 increases from one end side to the other end side in the X direction.

When viewed in the X direction, the center of the light-guide body 11, the center of the light-guide flange 13, and the center of the truncated-cone lateral engagement face 25 are identical to each other. Note that the light-guide body 11 protrudes slightly from the light-guide flange 13 onto one end side in the X direction. The first end face of the light-guide body 11 is formed in a circular shape and is orthogonal to the X direction.

The light guide 5 is formed by integral molding. However, the light-guide body 11 and the light-guide flange 13 may be separately molded, and then the light-guide body 11 and the light-guide flange 13 may be integrally fixed.

The case 7 includes the case body 17, a flange portion 33, and a light-emitting-unit fixing portion 35. The flange portion 33 is provided at a first end portion in the X direction of the case body 17. Thus, the planar engagement face 31 is formed at the first end in the X direction of the case body 17 and the flange portion 33.

The light-emitting-unit fixing portion 35 protrudes from the first end portion in the X direction of the case body 17 onto one end side in the X direction. Note that, even with the light-emitting-unit fixing portion 35 provided, the planar engagement face 31 at the end of the case body 17 is exposed in the state before the light-emitting unit 3 is fixed.

The light-emitting-unit housing 8 includes a light-emitting-unit housing body 37 and a light-exit portion 39 through which light emitted by the light emitter 9 travels outward from the light-emitting-unit housing 8. The outer shape of the light-emitting-unit housing body 37 is formed, for example, in a rectangular-parallelepiped shape, and the light-exit portion 39 is formed, for example, in a cylindrical shape.

The light-exit portion 39 is formed in a cylindrical shape and protrudes from the light-emitting-unit housing body 37 onto the other end side in the X direction such that the central axis thereof extends in the X direction. In the Y direction, the light-exit portion 39 is located at the central portion of the light-emitting-unit housing body 37. In the Z direction, the light-exit portion 39 is located on a first end side of the light-emitting-unit housing body 37.

The truncated-cone lateral engagement face 29 of the light-emitting-unit housing 8 is formed on the second end side in the X direction of the light-exit portion 39. The central axis of the light-exit portion 39 and the central axis of the engagement face 29 are identical to each other.

In the line illuminating device 1, the central axis of the cylindrical light-exit portion 39 and the central axis of the columnar light-guide body 11 are identical to each other. In the line illuminating device 1, the planar light-emitting face of the light emitter 9 and the planar end face at a first end in the longitudinal direction (X direction) of the light guide 5 are parallel to each other. The planar light-emitting face of the light emitter 9 is orthogonal to the X direction. As described above, the space 19 is interposed between the planar light-emitting face of the light emitter 9 and the planar end face at the first end in the longitudinal direction of the light guide 5.

Next, the operation of the line illuminating device 1 will be described.

Light emitted from the light-emitting unit 3 enters the light guide 5 through the circular first end face in the longitudinal direction of the light guide 5, and then travels in the longitudinal direction inside the light guide 5 to a second end in the longitudinal direction.

Then, the light travels outward through the lateral face of the light-guide body 11 of the light guide 5. Then, the light having travelled outward travels linearly outside the line illuminating device 1 through the opening 15 of the case 7.

In the line illuminating device 1, the light-guide flange 13 of the light guide 5 is interposed between the first end in the longitudinal direction of the case 7 and the light-emitting-unit housing 8 of the light-emitting unit 3. The line illuminating device 1 has the certain space 19 between the first end in the longitudinal direction of the light-guide body 11 and the light emitter 9 of the light-emitting unit 3.

Because of such a configuration, the position in the X direction of the light guide 5 is made to the light-emitting unit 3 in the longitudinal direction of the light-guide body 11, so that the first end in the longitudinal direction of the light-guide body 11 and the light emitter 9 of the light-emitting unit 3 are prevented from coming into contact with each other. Then, the first end in the longitudinal direction of the light-guide body 11 and the light emitter 9 of the light-emitting unit 3 are inhibited from being damaged, so that deterioration in the performance of light distribution, such as a drop in illuminance, can be inhibited.

In contrast to this, an illuminating device 301 according to a comparative example includes an LED 303, a light guide 305, and a positioning member 307.

The LED 303 is provided with a light-exit face 309. The light guide 305 is formed in an elongated shape.

The light guide 305 has an end face 311 opposed to the light-exit face 309 of the LED 303 and a light-exit portion 313 through which light having entered from the end face 311 travels outward. The positioning member 307 positions the end face 311 of the light guide 305 to the LED 303.

The light guide 305 includes an elongated core 315 having the end face 311 and a sheath 317 with which the outer circumferential face of the core 315 is sheathed. The positioning member 307 is arranged between the light-exit face 309 of the LED 303 and the end face 311 of the light guide 305. The positioning member 307 is provided with a protrusion 319 formed of a material pervious to light.

The protrusion 319 is provided abutting on the end face 311 of the core 315. This arrangement is likely to cause damage to the core 315 of the light guide 305. In contrast to this, as described above, the line illuminating device 1 has the space 19 between the light emitter 9 and the light guide 5, resulting in inhibition of the light emitter 9 and the light guide 5 from being damaged.

In the line illuminating device 1, the alignment portion 21 of the light-guide flange 13 and the alignment portion 23 of the light-emitting-unit housing 8 engage with each other such that the center of the first end face of the light-guide body 11 and the center of the light emitter 9 are identical to each other. Because of such a configuration, the light-emitting unit 3 is positioned in the Y direction and the Z direction to the light guide 5 in addition to being positioned in the X direction, so that light emitted by the light emitter 9 of the light-emitting unit 3 can be input into the light guide 5 more efficiently.

In the line illuminating device 1, the planar engagement face 27 of the light-guide flange 13 has surface contact with the planar engagement face 31 of the case 7, and the truncated-cone lateral engagement face 25 of the light-guide flange 13 has surface contact with the truncated-cone lateral engagement face 29 of the light-emitting-unit housing 8. Because of such a configuration, without intricacy, the light-emitting unit 3 is positioned in the Y direction and the Z direction to the light guide 5 in addition to being positioned in the X direction, so that light emitted by the light emitter 9 of the light-emitting unit 3 can be input into the light guide 5 more efficiently.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A line illuminating device comprising:
   a light-emitting unit including a light-emitting-unit housing and a light emitter that emits light;
   a light guide including a light-guide body formed in a rod shape and a light-guide flange provided at a first end portion that is one end portion in a longitudinal direction of the light-guide body; and
   a case including a case body formed in a rod shape, the case body being partially open when viewed in a longitudinal direction of the case body, the case body housing the light-guide body inside, wherein
   the light-guide flange is interposed between a first end in the longitudinal direction of the case body and the light-emitting-unit housing and contacts the case body and the light-emitting-unit housing so as to position the light guide-body with respect to the light emitter, and a space is formed between a first end in the longitudinal direction of the light-guide body and the light emitter.

2. The line illuminating device according to claim 1, wherein
   the light-guide flange and the light-emitting-unit housing are provided with respective alignment portions,
   the alignment portion of the light-guide flange and the alignment portion of the light-emitting-unit housing engage with each other, and a center of a first end face in the longitudinal direction of the light-guide body and a center of the light emitter are identical to each other when viewed in the longitudinal direction of the light-guide body.

3. The line illuminating device according to claim 1, wherein
   a truncated-cone lateral engagement face is provided on a first side that is one side in a thickness direction of the light-guide flange,
   a planar engagement face is provided on a second side that is another side in the thickness direction of the light-guide flange, the light-emitting-unit housing is provided with a truncated-cone lateral engagement face,
the first end in the longitudinal direction of the case body is provided with a planar engagement face,
the planar engagement face of the light-guide flange has surface contact with the planar engagement face of the case body, and the truncated-cone lateral engagement face of the light-guide flange has surface contact with the truncated-cone lateral engagement face of the light-emitting-unit housing.

* * * * *